US012633035B2

(12) United States Patent
Miraldo et al.

(10) Patent No.: US 12,633,035 B2
(45) Date of Patent: May 19, 2026

(54) NEURAL RADIANCE FIELD TRAINING BASED ON A NON-UNIFORM SAMPLE OF IMAGE PIXELS

(71) Applicant: Mitsubishi Electric Research Laboratories, Inc., Cambridge, MA (US)

(72) Inventors: Pedro Miraldo, Cambridge, MA (US); Goncalo Pais, Lisbon (PT); Marcus Greiff, Cambridge, MA (US); Moitreya Chatterjee, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 161 days.

(21) Appl. No.: 18/585,160

(22) Filed: Feb. 23, 2024

(65) Prior Publication Data
US 2025/0272909 A1     Aug. 28, 2025

(51) Int. Cl.
| | |
|---|---|
| *G06T 15/06* | (2011.01) |
| *G06T 7/194* | (2017.01) |
| *G06T 7/90* | (2017.01) |
| *G06V 10/764* | (2022.01) |

(52) U.S. Cl.
CPC .............. *G06T 15/06* (2013.01); *G06T 7/194* (2017.01); *G06T 7/90* (2017.01); *G06V 10/764* (2022.01); *G06T 2207/10024* (2013.01); *G06T 2207/20081* (2013.01)

(58) Field of Classification Search
CPC ........... G06T 15/06; G06T 7/194; G06T 7/90; G06T 2207/10024; G06T 2207/20081; G06T 15/08; G06T 17/00; G06T 15/20; G06V 10/764
See application file for complete search history.

(56) References Cited

U.S. PATENT DOCUMENTS

| | | | |
|---|---|---|---|
| 2002/0130888 A1* | 9/2002 | Perry ..................... | G06T 19/20 345/619 |
| 2019/0043403 A1* | 2/2019 | Van Droogenbroeck .................... | G09G 3/20 |
| 2022/0284659 A1* | 9/2022 | Takikawa .............. | G06T 17/005 |

OTHER PUBLICATIONS

Liu, Yichen, et al. "Instance neural radiance field." Proceedings of the IEEE/CVF international conference on computer vision. 2023 (Year: 2023).*
Sun, Cheng, Min Sun, and Hwann-Tzong Chen. "Improved direct voxel grid optimization for radiance fields reconstruction." arXiv preprint arXiv:2206.05085 (2022) (Year: 2022).*

(Continued)

*Primary Examiner* — Daniel F Hajnik
*Assistant Examiner* — Chris Alejandro Puntier
(74) *Attorney, Agent, or Firm* — Gene Vinokur

(57) ABSTRACT

Systems, methods, software, and devices are disclosed herein for training a neural network using multiple images of a scene captured from different viewing directions. The training is expedited by first determining foreground pixels in each of the multiple images, and then selecting a non-uniform sample of pixels from each of the multiple images such that the foreground pixels are overrepresented in the non-uniform sample of pixels relative to background pixels.

The neural network may then be trained using radiance values of voxels on rays propagating from each of the non-uniform sample of pixels along a corresponding viewing direction into the scene.

14 Claims, 10 Drawing Sheets

200

(56) References Cited

OTHER PUBLICATIONS

Mirzaei, Ashkan, et al. "Laterf: Label and text driven object radiance fields." European Conference on Computer Vision. Cham: Springer Nature Switzerland, 2022. (Year: 2022).*

Ben Mildenhall, Pratul P. Srinivasan, Matthew Tancik, Jonathan T. Barron, Ravi Ramamoorthi, Ren Ng. NeRF: Representing Scenes as Neural Radiance Fields for View Synthesis. ECCV 2020. (Year: 2020).*

Ben Mildenhall, Pratul P. Srinivasan, Matthew Tancik, Jonathan T. Barron, Ravi Ramamoorthi, Ren Ng. NeRF: Representing Scenes as Neural Radiance Fields for View Synthesis. ECCV 2020.

Zhaoshuo Li, Thomas Muller, Alex Evans, Russell H. Taylor, Mathias Unberath, Ming-Yu Liu, Chen-Hsuan Lin. Neuralangelo: High-Fidelity Neural Surface Reconstruction. CVPR 2023.

Peng Wang, Lingjie Liu, Yuan Liu, Christian Theobalt, Taku Komura, Wenping Wang. NeuS: Learning Neural Implicit Surfaces by Volume Rendering for Multi-view Reconstruction. NeurIPS 2021.

* cited by examiner

200

DETERMINE FOREGROUND PIXELS AND BACKGROUND PIXELS  201

DETERMINE SAMPLING PROFILE FOR TRAINING  203

SELECT NON-UNIFORM SAMPLE OF PIXELS PER SAMPLING PROFILE  205

TRAIN NERF USING NON-UNIFORM SAMPLE OF PIXELS  207

GENERATE GRID-SPACE PDF FROM SDF 401

TRANSFORM GRID-SPACE PDF TO IMAGE-SPACE PDF 403

USE IMAGE-SPACE PDF TO COMPUTE PIXEL PROBS. 405

CLASSIFY PIXELS BASED ON DETERMINED PROBS. 407

400

IDENTIFY (NEXT) PIXEL 501

PROJECT RAY INTO 3D SCENE 503

SELECT VOXEL ALONG RAY 505

OBTAIN PREDICTED COLOR AND RADIANCE VALUES 507

COMPUTE PREDICTED PIXEL VALUES 509

COMPUTE LOSS FUNCTION 511

ADJUST NeRF PARAMETERS 513

500

COMPUTING DEVICE    901

STORAGE SYSTEM    903

SOFTWARE    905

VISION PROCESS(S)    906

COMM. I/F SYS.    907

PROCESSING SYSTEM    902

USER I/F SYS.    909

NEURAL RADIANCE FIELD TRAINING BASED ON A NON-UNIFORM SAMPLE OF IMAGE PIXELS

TECHNICAL FIELD

Aspects of the disclosure are related to the field of computer vision technology, and in particular, to multiple-view reconstruction and novel view rendering.

BACKGROUND

A neural radiance field—or NeRF—is a type of neural network trained on a sparse set of two-dimensional (2D) images of a three-dimensional (3D) scene to provide novel views of the 3D scene. NeRFs represent a 3D scene as a continuous function that maps 3D coordinates to color and radiance values. Unlike traditional methods that use discrete meshes or point clouds to represent scenes, NeRFs work with a continuous representation, allowing for more detailed and accurate reconstructions.

Despite their advantages, NeRFs take a long time to train. Training a NeRF involves projecting a ray from an image pixel into a scene, and inputting 3D coordinates of voxels along the ray into a neural network. The network outputs corresponding color and radiance values for each voxel. The color and radiance values of the voxels along the ray are used to calculate a predicted color and radiance of the image pixel. A loss function evaluates the predicted values against the known values for the image pixel and updates parameters of the network accordingly.

Once trained, a NeRF may be integrated into a rendering pipeline to predict the color and radiance values of voxels along a ray projected from a pixel in a novel view into a scene. The predicted color and radiance values are processed to determine the color and radiance values for the pixel. The same steps are performed for all of the pixels in the novel view to produce an synthesized image. Ideally, a NeRF would be trained on every point in the scene. However, if each possible pixel and each possible voxel for that pixel were sampled, such high-resolution sampling would result in too many ground truth values needed for the training.

To that end, some training methods reduce the number of ground truth values used for the training by uniformly sampling pixels and voxels for the sampled pixels. In other words, the methods use only sparse sampling of the radiance field. Unfortunately, sparse sampling of this type, while improving the computational efficiency of the training, may degrade the quality of the trained NeRF and thus its ability to accurately represent a 3D scene.

SUMMARY

Systems, methods, and software are disclosed herein that improve computer vision technology in general, and multiple-view reconstruction and novel view rendering in particular, by improving the training of neural networks. In various embodiments, a neural network (e.g., a NeRF, a NeuS, or any combination or variation thereof) is trained using multiple images of a scene captured from different viewing directions. The training is expedited by first determining foreground pixels in each of the multiple images, and then selecting a non-uniform sample of pixels from each of the multiple images such that the foreground pixels are overrepresented in the non-uniform sample of pixels relative to background pixels. The neural network may then be trained using color and radiance values of voxels on rays propagating from each of the non-uniform sample of pixels along a corresponding viewing direction into the scene.

In an embodiment, training the network includes, for each pixel in the non-uniform sample of pixels, obtaining predicted color and radiance values from the network for the voxels on a ray corresponding to the pixel. The training also includes determining color and radiance values for the pixel based on the predicted color and radiance values for the voxels on the ray. A loss function evaluates a difference between the predicted color and radiance values for the pixel and the known color and radiance values for the pixel. The network's parameters may then be updated based on the result of the loss function.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
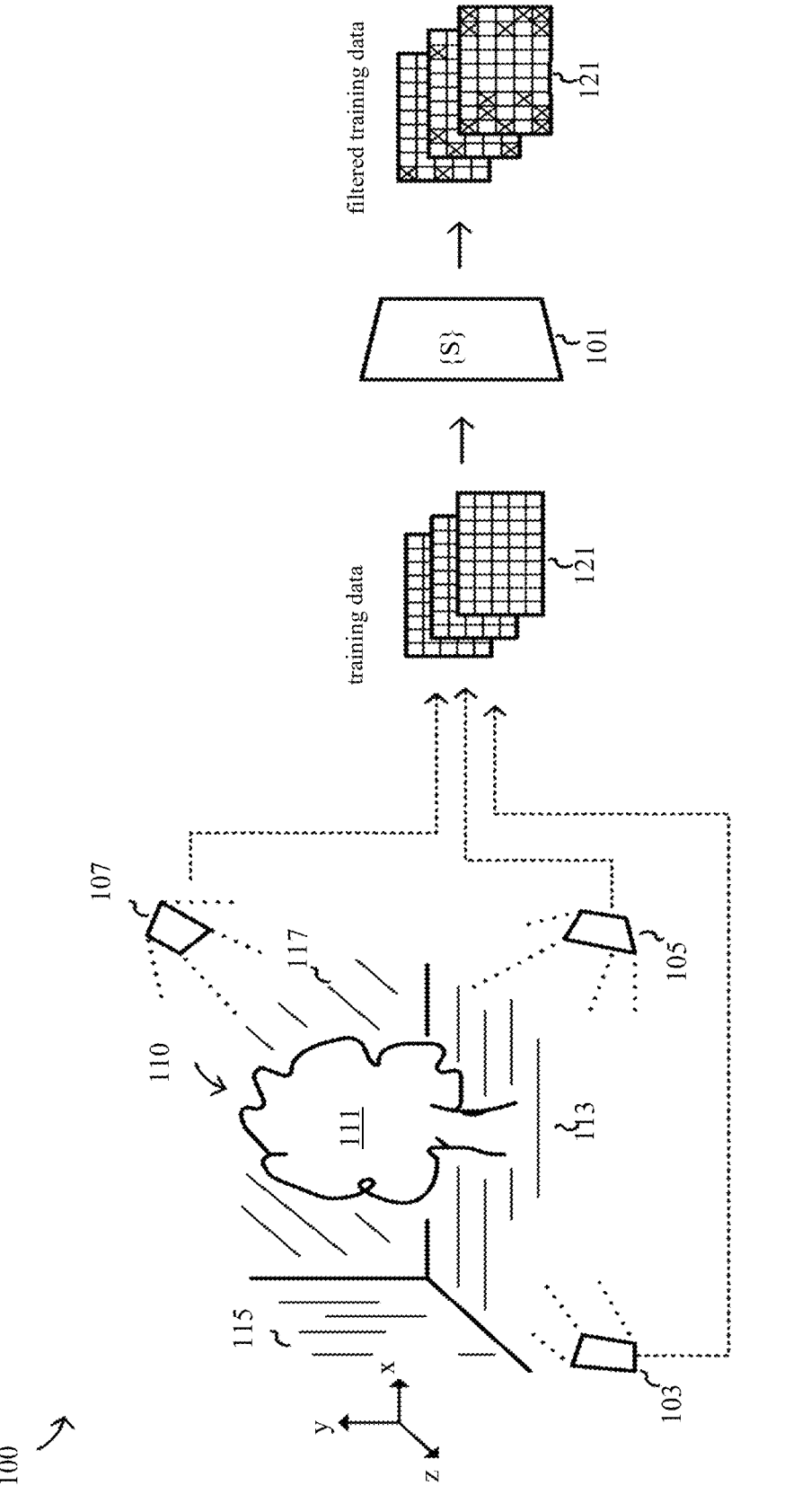
FIG. 1 illustrates a sampling environment in an implementation.

Improved techniques are disclosed herein for training a neural radiance field (NeRF)—and other such artificial neural networks—using multiple images of a scene captured from different viewing directions. The disclosed techniques improve the quality of rendered images produced using a NeRF.

A core idea of NeRF-type neural networks involves training the network to model a scene's radiance field. The network takes 3D coordinates as input and outputs corresponding color and opacity values. The neural network is trained on a set of images capturing different views of the scene, allowing it to learn the intricate details and lighting conditions. The training process involves optimizing the parameters of the neural network to minimize the difference between the predicted radiance values and the ground truth radiance values determined from the training images. This optimization is typically done using a combination of supervised and unsupervised learning.

The ground truth radiance values derived from the images can be produced by sampling the 3D scenes captured by the 2D images. To achieve such 3D sampling, various NeRF training methods uniformly sample both the image pixels and 3D projection rays extending from the pixels into the scenes. In other words, such 3D sampling samples voxels on rays projecting outward from the sampled pixels towards the scene. However—and as mentioned above—sampling every possible voxel, on every ray associated with every pixel, results in too many ground truth radiance values. Accordingly, some training methods reduce the number of ground truth radiance values used for the training by uniformly sampling pixels and voxels for the sampled pixels.

Some approaches have recognized that, while such sparse sampling can improve the computational efficiency of the training, it may degrade the quality of the trained NeRF and its ability to accurately represent the 3D scene. Guided sampling of voxels along the rays has been employed to reduce the number of ground truth radiance values used for the training in areas of less interest, while mitigating the degradation of the network quality caused by overly sparse training. Such guided sampling has involved uniformly sampling pixels and non-uniformly sampling voxels on the rays projected from the uniformly sampled pixels. Indeed, such guided sampling makes sense intuitively because voxels of the same ray far from the surface do not carry much information with respect to the voxels on or around the surface. Hence, it is possible to sample voxels of the rays only around the surface while maintaining network quality. However, even under this approach, the pixels of the images are still sampled uniformly, although the rate or density of sampling can be increased (or decreased) as desired. The advantageous techniques disclosed herein are based on a new recognition that in addition to, or as an alternative to the non-uniform voxel sampling described above, it is beneficial to perform non-uniform pixel sampling with foreground pixels sampled more often than background pixels. As used herein, "foreground pixels" refer to the pixels in an image that correspond to the main or primary object of interest in a scene, such as a person, an animal, a plant, an inanimate object, or the like. The main or primary object of interest in a scene is therefore referred to as a foreground object.

Foreground pixels are part of the foreground, as opposed to the background or other elements in the scene. For example, in an image of a person standing in front of a landscape, the person would be the foreground, and the landscape would be the background. The color, intensity, and other characteristics of the pixels that contribute to the person in this example are the foreground pixels. Because the person is more often a subject of interest than the landscape, the pixels of the person should be sampled more densely than the pixels of the landscape forming the background, thereby allowing the network to learn features of the person in more detail.

In various embodiments, the technique includes determining foreground pixels in each of the multiple images, and selecting a non-uniform sample of pixels from each of the multiple images such that the foreground pixels are over-represented in the non-uniform sample of pixels relative to background pixels. A NeRF may then be trained using color and radiance values of voxels on rays propagating from each of the non-uniform sample of pixels into the scene.

Training the NeRF may include, for each pixel in the non-uniform sample of pixels, obtaining predicted color and radiance values from the NeRF for the voxels on a ray corresponding to the pixel. A next step in the training includes determining predicted color and radiance values for the pixel based on the predicted color and radiance values for the voxels on the ray. A loss function may then be computed based on the predicted color and radiance values for the pixel and known color and radiance values for the pixel, and parameters of the NeRF updated based on a result of the loss function.

It may be appreciated that the NeRF may also be trained on uniform samples of pixels. For instance, an initial or early stage of training may utilize non-uniform samples of pixels to train the network, followed by later stages that utilize more uniform samples of pixels. Training early on non-uniform pixel samples, followed by more uniform pixel samples, allows the network to focus on foreground surfaces, while also learning background aspects of a scene.

In some embodiments, foreground pixels are determined by performing image segmentation on each of the multiple images to segment each image into the foreground pixels and the background pixels. However, in the same or other embodiments, foreground pixels are determined probabilistically. For example, determining the foreground pixels may be accomplished by, for each pixel in an image, determining a probability that the pixel comprises a foreground pixel, and classifying the pixel as belonging to the foreground pixels or the background pixels based on the determined probability.

In addition, determining the probability that the pixel is a foreground may include supplying image-space coordinates of the pixel as input to an image-space probability density function (PDF) that outputs the probability. In some implementations, a grid-space probability density function (PDF) for the scene is first computed using a neural representation of a signed distance function (SDF) for the scene. The grid-space PDF may then be converted or otherwise transformed into the image-space PDF. Examples of the training methods using SDF as part of their training pipeline include NeuS, VolSDF, and RegSDF methods. Notably, this internal SDF is determined for the foreground object of interest. Hence, it can be advantageous to reuse the SDF determined for training purposes to guide the image segmentation.

Some embodiments are based on recognizing that the image segmentation with internal SDF can be improved by a corresponding transformation of the internal SDF for different viewing directions employed by the training. To that end, some embodiments, transform the internal SDF into an extended image space wherein each pixel in the image space is defined by colors and depths. Doing this in such a manner allows to adjust this extended image space to each viewing direction by pruning pixels not visible (not forming an image) from a specific viewing direction. Thus, the signed distance of the voxel may be converted into a scene-space probability, which itself may be transformed into an image-space probability. The image-space probability determined for each voxel in the group may then form the basis for determining the probability that the corresponding ray intersects the foreground object.

The trained network, trained at least partially on the filtered set of image pixels, may then be leveraged by a rendering pipeline configured to generate synthesized images of scenes from novel views. For example, a novel view from an arbitrary viewing direction can be generated by querying the network for predicted color and radiance values at points along rays propagating from the pixels that form the image of the novel view. The predicted color and radiance values are then processed to determine the predicted color and radiance values of the pixels which, aggregated with other pixels determined in the same way, forms the image.

FIG. 1 illustrates sampling environment 100 in an implementation. Sampling environment 100 includes a sampling system 101, hereinafter referred to as system 101. Sampling environment 100 also includes image capture devices represented by cameras 103, 105, and 107. Cameras 103-107 each capture 2D images of scene 110, which amount to some or all of the training data 121 processed by system 101. Scene 110 is a 3D scene that includes an object 111 (representing a tree in this example) surrounded on three sides by wall 115, wall 117, and ground 113. While shown here as multiple individual cameras, it may be appreciated that a single camera could be used to capture all of the images from all of the viewing directions. In addition, while only three different viewing directions are shown, it may be appreciated that many more viewing directions are possible (e.g., 20-30, or more).

Figure 2:
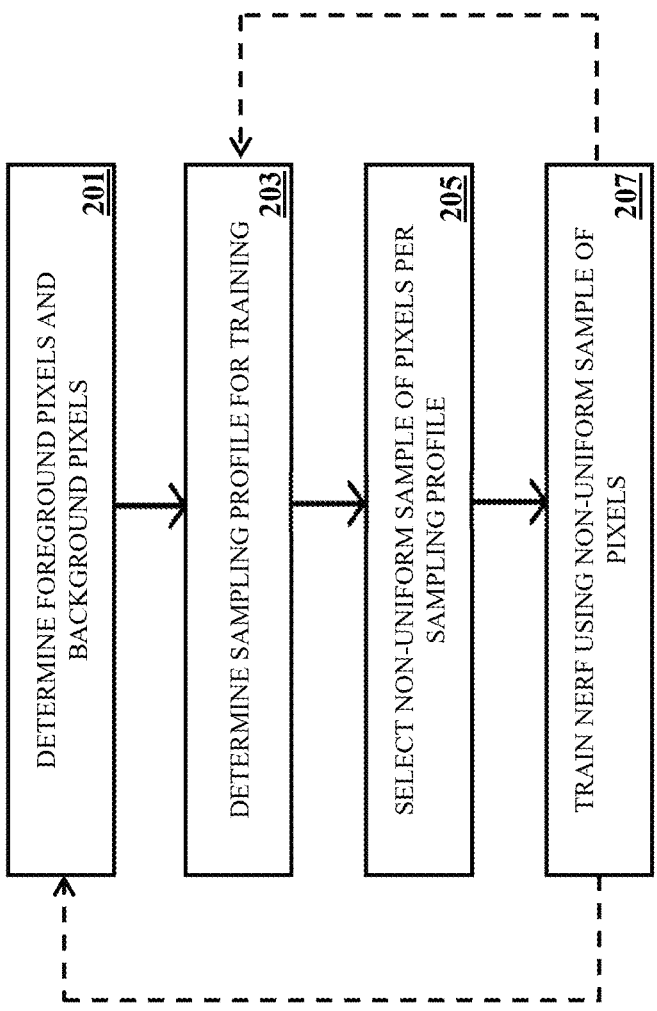
FIG. 2 illustrates a training process in an implementation.
Figure 2:
Figure 9:
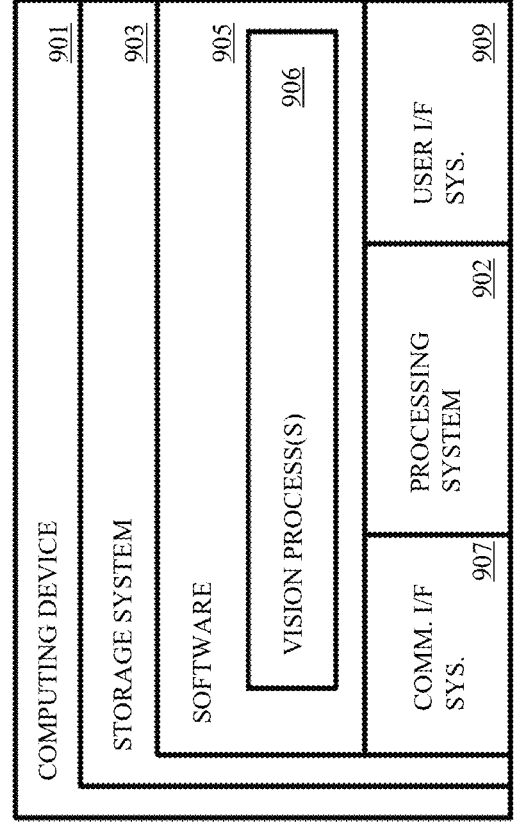
FIG. 9 illustrates a computing system suitable for implementing the various operational environments, architectures, processes, scenarios, and sequences discussed below with respect to the other Figures.

System 101 may be implemented in computer hardware, software, and/or firmware, examples of which are provided by computing device 901 in FIG. 9. FIG. 2 illustrates a sampling process 200 employed using system 101 in the context of training a neural network. Indeed, sampling process 200 may be implemented in program instructions in the context of the software and/or firmware elements of system 101. Sampling process 200 may be applied once per training epoch, for example, or at some other cadence or interval, to identify the pixels on which to train a neural network. The program instructions, when executed by one or more processing devices of one or more computing systems, direct the one or more computing systems to operate as follows, referring parenthetically to the steps in FIG. 2, and in the singular to a computing device for the sake of clarity.

In operation, the computing device identifies foreground pixels and background pixels in the images produced by cameras 103, 105, and 107 (step 201). Each image includes a grid of pixels, and each pixel in the grid includes color and radiance values. The computing device may differentiate the foreground pixels in each image from the background pixels using image segmentation techniques. In other embodiments, the computing device may leverage an implicit representation of a signed distance function (SDF) to discriminate between foreground and background pixels in the images.

Having identified the foreground pixels, the computing device determines a sampling profile or mode in accordance with which to select samples for training (step 203). The sampling profile indicates how uniform (or non-uniform) to make a set of pixels with respect to the relative balance of foreground pixels to background pixels. For example, a fully uniform sampling profile would cause the computing device to sample image pixels evenly, without respect to whether they are foreground or background pixels. In contrast, setting the sampling profile to 20% would cause twenty percent of the image pixels to be sampled uniformly, without regard to their status as foreground or background pixels.

At the outset, it may be assumed for exemplary purposes that the sampling profile is set to a degree that causes a non-uniform sampling in favor of foreground pixels. Accordingly, the computing device proceeds to select a non-uniform sample of pixels from the images such that foreground pixels are sampled more often than background pixels (step 205). Stated another way, a non-uniform sampling results in an overrepresentation of foreground pixels in the training data relative to background pixels. For instance, the computing device may select foreground pixels for inclusion in the training data such that the training data has a disproportionate number of foreground pixels in it relative to background pixels, when considering the proportion of each type in the original images.

Next, the computing device proceeds to train the neural network using the modified (reduced size) training data (step 207). It may be appreciated that the same computing device need not perform the training, but rather may hand off to another system or sub-system (not pictured). The sampled training data not only has fewer pixels over all relative to the original image data, but as a non-uniform representation of foreground pixels relative to background pixels, allowing the network to learn characteristics of foreground objects in more detail and in less time than otherwise.

It may be appreciated that, once a given training epoch is complete, sampling process 200 may optionally return to step 203 before commencing with another training epoch, thereby allowing the neural network to be trained in accordance with different sampling profiles. Alternatively, or in addition, sampling process 200 may optionally return to step 201 to update the foreground and background pixels. In the latter case, the computing device proceeds to update the classification of foreground pixels and background pixels (step 201) and then moves to step 203. In the former case, the computing device proceeds to identifying the next sampling profile (step 203), for example transitioning to a more uniform (less non-uniform) profile, or to an even less uniform profile than the current profile. The computing device also proceeds again through the same steps discussed above, including selecting pixels per the determined sampling profile (step 205), although at this point—or during subsequent cycles—the sampling profile may call for uniform sampling to at least some degree. Eventually, training of the neural network is complete and the process stops.

Figure 3:
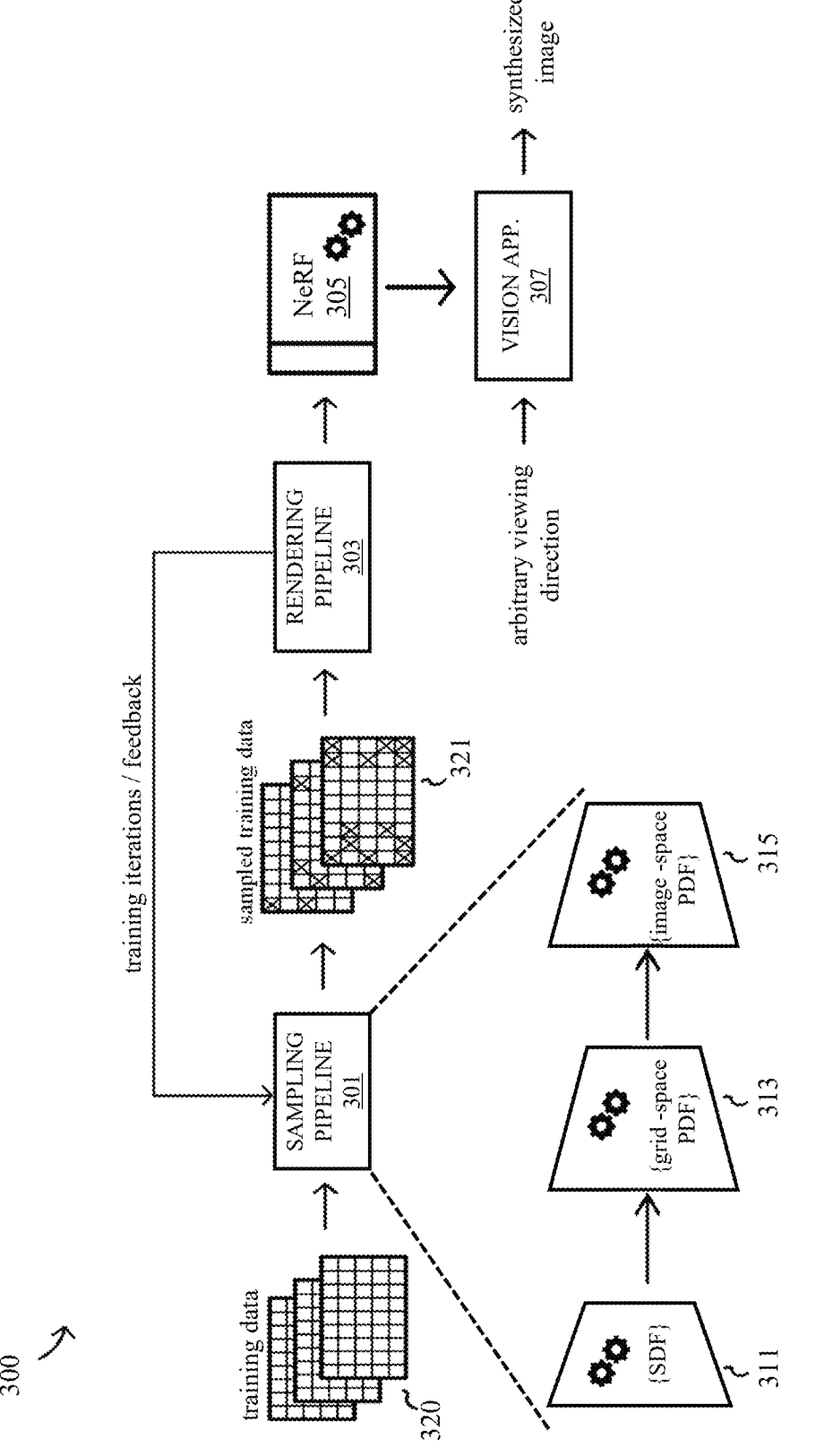
FIG. 3 illustrates a computer vision environment in an implementation.

FIG. 3 illustrates a computer vision environment 300 in another implementation. Computer vision environment 300, which may be implemented in computer hardware, software, and/or firmware, includes sampling pipeline 301, rendering pipeline 303, NeRF 305, and vision application 307. Sampling pipeline 301 further includes a signed distance function (SDF 311), a grid-space probability density function (PDF 311), and an image-space probability distance function (PDF 313). Sampling pipeline 301 is operatively coupled with rendering pipeline 303 to produce NeRF 305, which may be utilized by vision application 307 to produce synthesized images of novel views.

Sampling pipeline 301, rendering pipeline 303, and vision application 307 may each be implemented in software or firmware executed by the circuitry of one or more processing devices of on a single computing device or distributed across multiple computing devices. Alternatively, or in addition, some or all of the functionality provided by any of the elements may be implemented entirely via application-specific integrated circuits or other such special purpose processing devices.

Generally speaking, sampling pipeline 301 takes training data 320 as input, and outputs a sampled version of the training data, represented herein by training data 321. Training data 320 represents all possible pixels and respective 3D voxels, while training data 321 represents a sampled version of training data 320 in that it consists of fewer image pixels than the set represented by training data 321. Training data 321 is supplied as input to rendering pipeline 303 which uses it in the context of training NeRF 305. Using training data 321 rather than training data 320 improves the quality of images rendered using NeRF 305.

More specifically, sampling pipeline 301 controls the flow of data through the pipeline. Sampling pipeline 301 computes PDF 313 based on SDF 311. In addition, sampling pipeline 301 computes PDF 315 based on PDF 313. The resulting image-space probability function (PDF 315), is capable of outputting a probability that a given pixel in an image is a foreground pixel. The resulting image-space probabilities are leveraged to classify a pixel as a foreground pixel vs. a background pixel.

Figure 4:
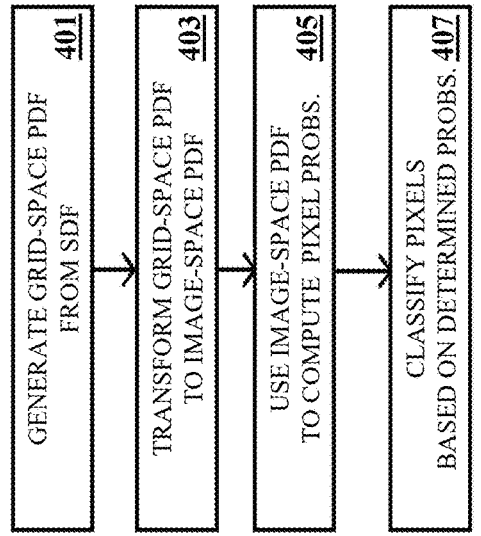
FIG. 4 illustrates a sampling process in an implementation.
Figure 4:

FIG. 4 illustrates sampling process 400 in an implementation, which is representative of the combined steps carried out by probability density function 311, image space function 313, and classification function 315. Sampling process 400 may be implemented in program instructions in the context of the software and/or firmware elements of sampling pipeline 301. The program instructions, when executed by one or more processing devices of one or more computing systems, direct the one or more computing systems to operate as follows, referring parenthetically to the steps in FIG. 4, and to a computing device in the singular for the sake of clarity.

To begin, the computing device computes a grid-space probability density function (PDF) from a neural representation of a signed distance function (SDF) for the scene (step 401). The SDF represents the signed distance of each 3D voxel. The signed distance value represents a distance of a voxel from a surface of a foreground object in the scene, where a positive value indicates that the voxel is outside the foreground object, while a negative value indicates that the voxel is inside the foreground object.

The grid-space PDF represents the signed distance of each voxel in terms of a value within a range (e.g., between 0 and 1). In other words, the probability density value represents a probability of the signed distance value. Whereas the signed distance represents a distance of the voxel to a surface of the foreground object, the probability density value comprises a real number between 0 and 1 that represents a location of the signed distance of the voxel in a range of signed distance values.

Both the SDF and the PDF are given in terms of the real-world x-y-z coordinates of the scene. Accordingly, the computing device also proceeds to transform the grid-space PDF to an image-space PDF (step 403) that takes into account the deformation of voxels from the grid space to the image space and/or to account for perspective distortion associated with the camera. The image-space PDF may be queried directly to determine a probability that a given pixel is a foreground pixel.

Having computed the image-space PDF, the computing device begins to iterate through the image pixels and to compute the foreground probability of each pixel (step 405). This is accomplished by querying the image-space PDF with the x-y coordinates of the pixel in the image space. The image-space PDF returns a value used to classify the pixel as a foreground pixel or a background pixel (step 407).

It may be appreciated that not all foreground pixels need be included in the training set, nor all background pixels excluded from the training set. Rather, whether the selected pixel is ultimately included in the training set may also depend upon the relevant sampling profile at the moment. For example, the sampling profile may call for the inclusion of at least some background pixels in the training set, meaning that even if a pixel is classified as a background pixel, it may still be included in the set.

Figure 5:
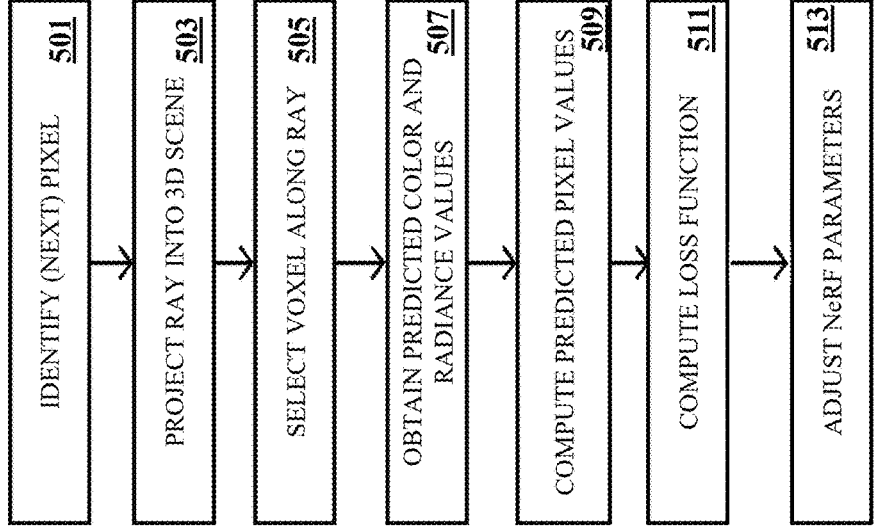
FIG. 5 illustrates a training process in an implementation.

FIG. 5 illustrates training process 500 in an implementation, which is representative of the steps carried out by rendering pipeline 303 in FIG. 3. Training process 500 may be implemented in program instructions in the context of the software and/or firmware elements of rendering pipeline 303. The program instructions, when executed by one or more processing devices of one or more computing systems, direct the one or more computing systems to operate as follows, referring parenthetically to the steps in FIG. 5, and to a computing device in the singular for the sake of clarity.

In operation, a computing device identifies an image pixel in a training image (step 501). The training image is one of a set of training images captured of a scene from multiple different viewing directions. The computing device projects a ray from the pixel along the viewing direction of the image into the scene (step 503) and selects voxels along the ray (step 505) with which to train a neural network (e.g., a NeRF).

The computing device proceeds to obtain predicted color and radiance values for each of the selected voxels from the neural network (step 507). To do so, the computing device inputs the x-y-z coordinate of a given voxel into the network (as well as the relevant azimuth and elevation angles, or voxel orientation), which outputs a predicated color and a predicted radiance value for the voxel. Doing so for each of the selected voxels allows the computing device to compute a predicted color value and a predicted radiance value for the subject pixel (step 509).

Next, the computing device computes a loss function for the subject pixel based on a comparison of the predicted color and radiance values to known color and radiance values for the pixel (step 511). The output of the loss function factors into if/how parameters of the NeRF are updated (step 513), if at all.

Figure 6:
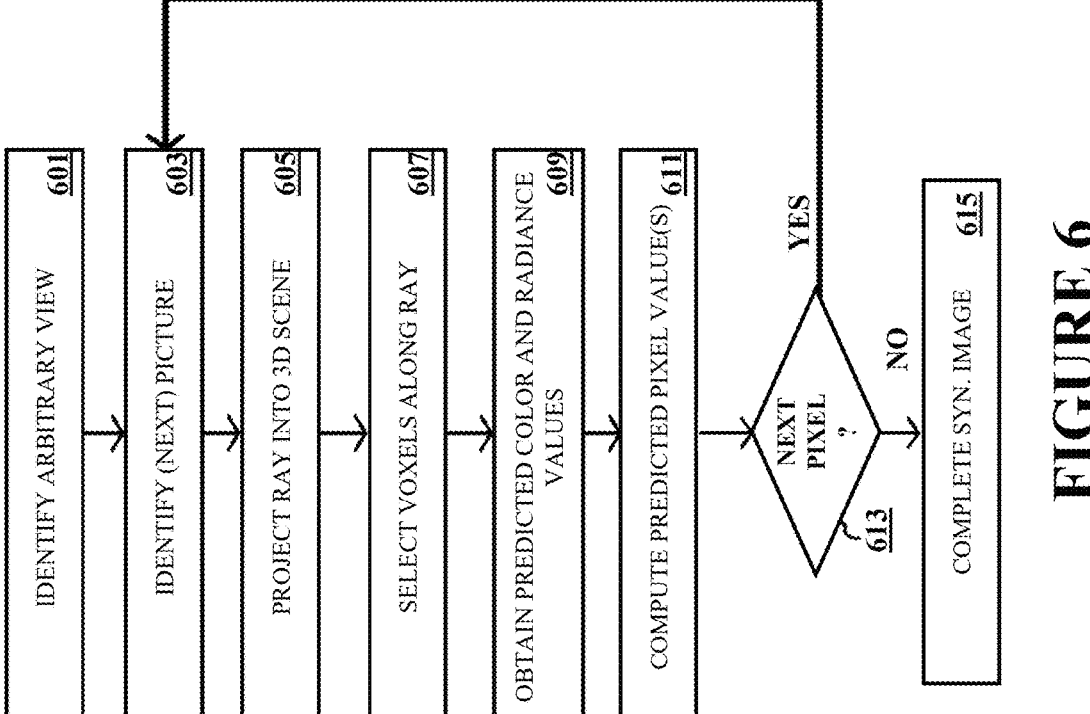
FIG. 6 illustrates a rendering process in an implementation.
Figure 6:

Eventually, the network is sufficiently trained to output color and radiance values for any voxel location in the 3D scene. Thus, the network may be employed by an image rendering pipeline to reconstruct novel views of the scene. That is, the neural network can be leveraged to produce 2D images that are novel with respect to the training images. FIG. 6 illustrates rendering process 600 in one such example embodiment.

Rendering process 600 may be implemented in program instructions in the context of the software and/or firmware elements of vision application 307. The program instructions, when executed by one or more processing devices of one or more computing systems, direct the one or more computing systems to operate as follows, referring parenthetically to the steps in FIG. 6, and to a computing device in the singular for the sake of clarity.

In operation, the computing device identifies an arbitrary view of a scene (step 601). The arbitrary view may be indicated by, for example, the direction and angle of a theoretical camera. The computing device then identifies a pixel in a synthesized image to be reconstructed by querying the neural network trained in accordance with training process 500 (step 601).

The computing device projects a ray from the current pixel in a viewing direction of the synthesized image into the scene (step 605) and selects voxels along the ray with which to query the network (step 607). The voxels may be selected on a uniform basis, a non-uniform basis, or some combination or variation thereof. The computing device inputs the location of each voxel one-by-one into the neural network (as well as their orientations), to obtain predicted color and radiance values for each voxel from the network (step 609).

The computing device then computes a predicted color and radiance value for the pixel based on the voxels' color and radiance values (Step 611).

Steps 603-611 are repeated for each pixel in the synthesized image until, at step 613, a determination is made that no more pixels are to be processed. At that point, the synthesized image is complete, and it may be displayed, saved, shared, or the like (step 613).

Figure 7A:
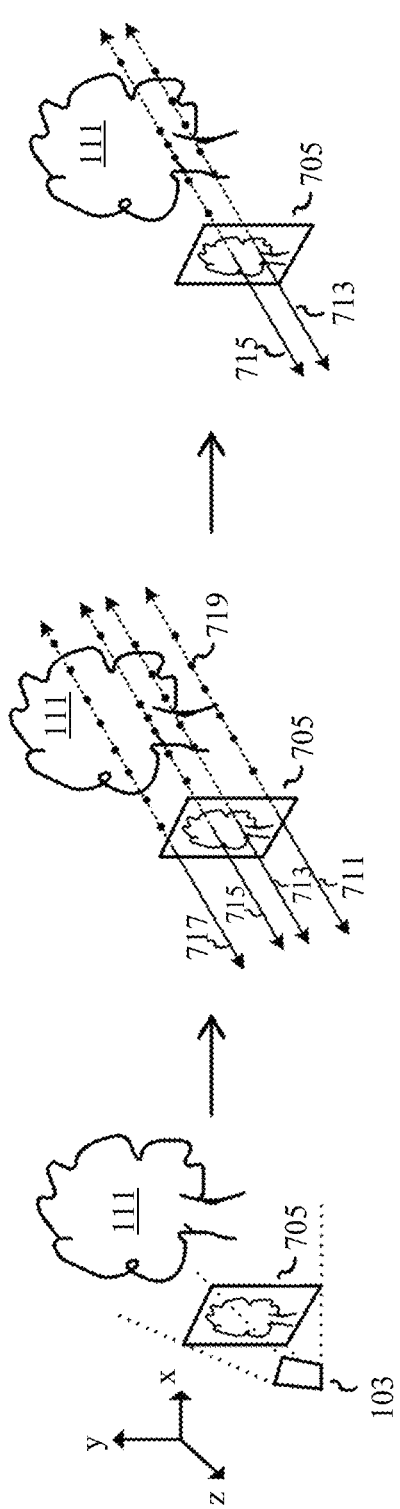
FIGS. 7A-7B illustrate an operational example in an implementation.
Figure 7B:
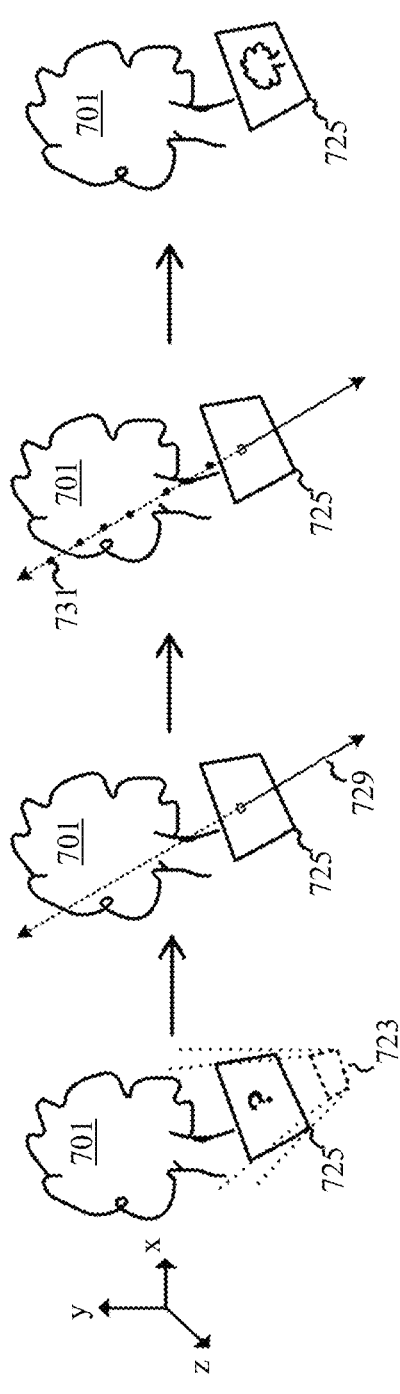

In FIGS. 7A-7B, operational scenario 700 illustrates an application of sampling process 400 and rendering process 600 to scene 110 in FIG. 1. In operation, camera 103 captures an image 705 of the scene, including object 111 (a tree). The other cameras do as well, although they are not shown for purposes of clarity. Thus, image 705 forms part of a training set, along with the other images captured by the other cameras at different locations (or by the same camera at the different locations).

Next, sampling process 400 is applied to the images in the training data. Here, sampling process 400 is illustrated with respect to just image 705, although it would be applied as well to the other images in the training set.

Sampling process 400 leverages a neural representation of an SDF to generate a grid-space PDF. Using rays 711-717 projected through the pixels of image 705 into the scene to illustrate the point, the SDF represents a signed distance of each voxel along the ray to a foreground object. Rays 711-717 represent only a limited number of the total rays for the sake of clarity, and only a small number of voxels are shown for the sake of clarity. The SDF may be queried using the x-y-z location of each voxel in grid-space to obtain its signed distance value.

Next, sampling process 400 transforms the grid-space PDF to an image-space PDF. The image-space PDF may be queried using the x-y coordinates of a pixel in image-space to obtain a probability that the pixel corresponds to a foreground object in the scene. In simpler terms, sampling process 400 determines the likelihood that a ray extending outward from a given pixel intersects a foreground object in the scene. If so, then the pixel can be classified as a foreground pixel. If not, then the pixel can be classified as a background pixel.

In FIG. 7A, it is shown and assumed for exemplary purposes that ray 717 and ray 711 do not intersect object 111. Accordingly, the pixels corresponding to ray 717 and ray 711 may be excluded from the training dataset, at least for one training epoch (if not more).

In FIG. 7B, it is assumed for exemplary purposes that a neural network has been trained based on a sampled data set produced in accordance with the illustration in FIG. 7A. That is, the neural network may be trained on a sampled training set that is disproportionately focused on foreground pixels over background pixels. Per training process 500, the neural network is trained to output color and radiance values for voxels along rays projected outward from novel views into a scene. The voxel values are then used to compute color and radiance values for a corresponding pixel which, in the aggregate, form an image of the novel view.

Here, a novel view 725 is projected from a hypothetical camera 723. The position and orientation of the hypothetical camera 723 determines the position and orientation of the novel view 725 and its image pixels. For each pixel 727 in the novel view 725, rendering process 600 projects a ray 729 through the view into the scene. Rendering process 600 samples voxels along the ray 729 (e.g., voxel 731) and inputs their x-y-z coordinates into the neural network. The neural network outputs a predicted color and radiance value for each pixel. Rendering process 600 accumulates the values and processes them to determine a predicted color and radiance value for each pixel (e.g., pixel 727). The pixel values in the aggregate form the synthesized image of the novel view 725.

Framework Discussion

The following sections describe in more detail a framework for implementing the concepts discussed above. The framework may be implemented in program instructions in the context of software and/or firmware elements. The program instructions, when executed by one or more processing devices of one or more computing systems, direct the one or more computing systems to operate as described below with respect to the framework.

Framework Summary

Several variants of Neural Radiance Fields (NeRFs) have been proposed to improve the accuracy of synthesized images and 3D surface reconstruction. In all such methods, a key characteristic is that none of them can train the neural network with every possible input data—every pixel and possible 3D point on the projection rays. 2D and 3D sampling is necessary to make the training computationally feasible. While vanilla NeRFs uniformly sample both the image pixel and 3D projection rays, it is primarily focused on guiding the sampling of the projection ray's 3D points.

The framework proposed herein, on the other hand, introduces a novel sampling approach. Based on the scene's implicit surface representation, a probability density function is modeled in a 3D image projection space to guide the sampling of the rays to regions of interest. In contrast to prior methods that guide sampling in the image space with supplementary data, the proposed sampling space is built through a series of coordinate transformations and view constraints, eliminating the need for external supervision. The proposed sampling strategy can be plugged into the current state-of-the-art neural implicit surface renderer, resulting in more accurate and detailed 3D reconstructions and image rendering of regions of interest, showcasing promising advancements in neural surface rendering for various applications.

Multiple-view reconstruction and novel view rendering (video generation) have been some of the most studied problems in computer vision in the last few years. Neural Radiance Fields (NeRFs) emerged as a promising solution to these typical computer vision problems. Unlike classical multi-view stereo techniques that typically provide sparse representations, NeRF-like solutions provide dense 3D representations by evaluating each point on a 3D projection ray for occupancy and color. The ability to recover the 3D structure of the scene and to render new views/videos is valuable for numerous tasks such as AR/VR asset creation, 3D reconstruction, or environment mapping.

NeRFs aim to learn an implicit representation of a particular scene/object and use it for rendering. In theory, while training, it would be desirable to incorporate every image, every pixel, and sample densely on the projection ray. Given the large amount of data involved in these problems, this is not feasible. To make the training viable, one must sample both the image pixels and the projection ray. While vanilla NeRFs rely mostly on uniform sampling, alternatives focus on guided sampling strategies on the 3D projection ray, with some gains in rendering accuracy.

Recent camera-free dense reconstruction strategies, like NeuS and variants, explore neural implicit representations to obtain greater detail and higher resolution representations and are not bound to a camera view. These models use a Signed Distance Field (SDF) as a neural implicit representation, which proved to be better in capturing the 3D structure of the environment and in getting a more accurate image rendering. For sampling, NeuS-like approaches explore the claim that using the implicit surface representation while training improves accuracy. All follow a standardized sampling strategy that uniformly samples rays in the image, followed by guided hierarchically sample points along the respective projection rays (computed from the sampled pixels). Subsequent works use 3D information to improve accuracy. Most use Structure-from-Motion (SfM) 3D points resulting from the pose estimation (typically running COLMAP) to improve depth estimation, image quality, and depth consistency.

Leveraging the 3D implicit scene representation is a clever way of guiding the 3D sampling, but the full power of this idea has not been explored. Indeed, most methods only guide the sampling in the projection rays. The novel framework proposed herein accomplishes the following: 1) leverages the 3D implicit surface representation model to target areas of interest in the image or intricate surfaces; and 2) provides a self-guided sampling towards regions of interest in the image space, which helps in 3D object/scene reconstruction and image rendering.

The framework guides the sampling for a better 3D scene representation and image rendering. For that, the framework follows the latest neural surface rendering pipelines that learn implicit surface representations. The framework autonomously explores the 3D representation to select regions of interest for the 2D and 3D samplings—it self-supervises the model to target areas where 3D information is more relevant. The framework provides at least the following advantageous technical effects: 1) a theoretically justified strategy for probabilistic 3D orthogonal image projection sampling for neural implicit surface rendering techniques that is view-dependent; 2) sampling that is agnostic to the implicit surface model, i.e., the derived extra pipeline steps can be used with different models without changing architectures; and 3) effective coupling of the proposed probabilistic sampling with current state-of-the-art neural implicit representation methods, which improves 3D reconstruction and rendering in regions of interest.

Multi-View Reconstruction

Reconstruction of 3D structures from sequences or collections of images is a widely researched topic and is the foundation of problems such as Structure-from-Motion [or Simultaneous Localization and Mapping].

Classical computer vision approaches estimate depth by integrating multiple measurements from monocular or stereo cameras and reconstruct the environment by fusing the depth maps obtained for each view. One challenge of these approaches is to obtain accurate depth estimates, which depend heavily on the image features, camera properties, etc. To tackle this problem, COLMAP uses photometric and geometric information (image features matched across different views) to improve view selection and the estimation accuracy of depth and normals and performs reconstruction via bundle adjustment. Other solutions use probabilistic depth maps based on local geometry or camera properties, while still others use learning-based architectures that take advantage of deep image features and learned volume construction. The downside of these approaches is that the geometric properties of the scene cannot be fully retrieved, i.e., the 3D scene reconstruction is typically sparse.

NeRF introduced a new view synthesis strategy that enabled dense reconstructions. During training, projection rays and 3D points are uniformly sampled from the image and projection rays, respectively. Image synthesis is achieved by volume rendering the sampled 3D points, which gives their color and density values. Several NeRF variants have been proposed, focusing on improving view synthesis quality, improving computational performance, scaling up to large-scale environments, dynamic scenes, among others. Despite significant improvements, these approaches do not capture all the geometric properties of a scene.

A drawback of the volume rendering technique used by NeRF is that it imposes insufficient restrictions on the surface 3D representation. This means that it cannot learn intricate 3D details, which makes high-quality reconstructions infeasible. To solve this problem, recent approaches model the scene's surface using 3D representation techniques such as occupancy fields and SDFs. These neural implicit representations add extra geometric constraints to the surface representation and allow it to be optimized directly, substantially improving the results.

NeuS and VolSDF were the first methods to use SDF as an implicit representation for a surface, which was trained from multiple views, and utilized for volume rendering. Both were able to outperform NeRF-based methods, even handling scenes with occlusions. One issue with NeuS is its training procedure being slow. To improve the training speed, NeuS2 proposes an efficient parallelization and a new training strategy that speeds up the training considerably. Focusing on highly detailed 3D structures even in large-scale scenes, Neuralangelo introduces multi-resolution hash grids for surface rendering. This approach achieves high-quality reconstruction in highly detailed scenes, with a small cost in training efficiency. NeuralWarp and HF-NeuS also aim to improve the rendering of high-frequency textures. While NeuralWarp adds a photo consistency term to the rendering optimization procedure, HF-NeuS decomposes the implicit function into a base and a displacement function that focuses the optimization on the most intricate areas. These approaches use the learned implicit representation for sampling on the projection rays. The novel framework disclosed herein leverages the learned implicit representation for sampling the projection rays, i.e., for sampling the pixels.

To further refine surface details, some existing approaches use prior information such as object masks, depth, normals, or point clouds. These inputs provide additional geometric constraints that guide the surface learning process, improving reconstruction results and optimization time. For instance, RegSDF utilizes oriented point clouds that provide accurate geometric properties and aid in supervising structured areas of the scene. In the novel framework disclosed herein, by sampling according to the surface probabilities, sampling is performed primarily in textured areas, thereby improving the reconstruction of those areas. However, unlike RegSDF, such novel focused sampling is achieved by focusing the sampling on those regions, without additional inputs.

Notation

A 3D point in world coordinates is given by $x=[x, y, z] \in \chi \subset \mathbb{R}^3$. For a set of cameras $\{1, \ldots, C\}$, the same point in the cth camera's frame is written as $\hat{x}_c=[\hat{x}_c, \hat{y}_c, \hat{z}_c] \in \hat{\chi}_c$, where $h_c(\bullet)$ transforms the 3D point from the world to the frame of camera c. The same 3D point is projected to the 3D image projection space of camera $$cu_c = g(\hat{x}_c) = \left[\frac{\hat{x}_c}{\hat{z}_c}, \frac{\hat{y}_c}{\hat{z}_c}, \hat{z}_c\right] = [u_c, v_c, \lambda_c] \in \mathcal{U}_c$$

where $\mathcal{U}_c$ bounded from the intrinsic parameters of each camera and $\lambda_c > 0$, which is bijective to the camera reference frame. Using the transformation from the world coordinates to the camera coordinates $hc(\bullet)$ and image projection $g(\bullet)$, the composition is defined as $f_c(\bullet)_{:c} = f_c(x) = g(h_c(x))$. To simplify the notations, the c subscript is omitted, for example, $u = u_c$ and $\hat{x}_c = \hat{x}$. Finally, $|\bullet|$ denotes the matrix determinant.

Neural Implicit Surface Rendering

Consider a set of images of a specific scene from calibrated cameras with known poses. NeRF strategy creates an implicit 3D representation of the scene from known camera positions and images. This implicit representation allows for a dense reconstruction of the scene, by simultaneously estimating the density and color for every 3D point.

An existing alternative to NeRF converts densities from an SDF representation approximated by a logistic density function, $$\phi_s(o) = \frac{se^{-so}}{1 + e^{-so}},$$

where s is the scale and o the SDF output. This conversion enables the application of camera-free volume rendering techniques for scene reconstruction. Using the SDF, the scene's surface $\mathcal{S}$ is represented as the zero-level set, defined as $\mathcal{S} = \{x \in \mathbb{R}^3 : S(x) = 0\}$, where $S(\bullet)$ is the SDF network. The rendering is computed $\mathbb{R}$ using the SDF at a particular 3D point. The opacity at each point along the ray is determined using the following expression:

$$\alpha_i = \max\left(\frac{\Phi_s(S(i)) - \Phi_s(S(i+1))}{\Phi_s(S(i))}, 0\right), \tag{1}$$

where $\Phi_s(\bullet)$ is the sigmoid function.

Probability Densities and Grid Representations

In an advanced proposed herein, Probability Density Functions (PDFs) are represented using grids and weights. Specifically, let $A_i \in A$ be a voxel centered on $\breve{a}_i$ with volume denoted by $\delta(A_i) > 0$, such that $\cup_i A_i = A$ and $\cap_i A_i = \emptyset$. Referring to a collection of voxels as a grid, and associating each voxel with a weight, the PDF is characterized as:

$$P(a) = w_i^a \forall a \in A_i. \tag{2}$$

Further, define PDF $p: \longmapsto \mathbb{R}_{\geq 0}$ in Eq. 2 by a set of weights $$\{w_i^a \geq 0\}_i$$

on a grid $G_A = \{(\breve{a}_i, A_i)\}_i$. For multiple PDFs defined on the same grid, then $\tilde{p}(a)$ is associated with the weights $$\{\tilde{w}_i^a \geq 0\}_i.$$

Probabilistic Guided Sampling

A new sampling strategy is disclosed herein that seamlessly merges in neural surface rendering pipelines. Consider a typical neural surface rendering pipeline. An intermediate step consists of obtaining an SDF that models the scene's 3D structure. The SDF is utilized for guiding the sampling during training. However, instead of just using the SDF to guide the sampling on the 3D ray, computed from uniform image sampling, the goal is to guide the sampling of rays in the image.

The goal is to have a framework that converts SDF outputs over training iterations into some probability in grid space that we can directly use for sampling intricate areas in the image. The framework begins by taking advantage of the logistic distribution SDF representation to define the PDF, denoted as p(x):

$$p(x) = w_i^x = \phi_s(S(\breve{x}_i)), \forall x \in X_i. \tag{3}$$

Next, the framework explores the properties of the new PDF representation of the 3D scene (instead of the SDF values). The goal is to transform p(x) into a suitable 3D space for image sampling, that addresses scene occlusions related to the camera's viewpoint and direction. Thus, the transformation has to be bijective and consequently invertible, which is denoted as $\mathcal{U}$. The space $\mathcal{U}$ is obtained from $\chi$ by transforming the projection rays such that they are parallel to each other and perpendicular to the image space (orthogonal projection space). This new PDF is defined as p(u) on the grid G, and its transformation is described below.

Next, the framework deals with the visual dependency. Rather than sampling directly in the image from the scene's projection and probabilities, where awareness of view dependency is limited, the framework weighs the camera's PDF considering a volume rendering strategy. This allows for seamless integration of view dependency and guided sampling. Then, the PDF is changed to account for these constraints (see below). A new PDF is defined as $\tilde{p}(u)$.

The final step of the framework's derivations consists of sampling 3D points on G using as $\tilde{p}(u)$. The proposed method follows a conditional sampling strategy, and it is derived below. Further below is a description of how points are sampled along the rays during training.

Interpolation

Given p(x) defined on a grid $G_\chi$, the framework seeks to represent this PDF in camera coordinates over a grid $G_\mathcal{U}$. The framework seeks to obtain this new PDF representing the probability distribution on the 3D image space $\mathcal{U}$ (space of 3D parallel projection rays perpendicular to the image plane). To this end, the framework utilizes a novel proposition that relates the weights in one grid to another via interpolation, accounting for the 3D projection $f(\bullet)$. The basic intuition is to account for the deformation of the voxels through $f(\supseteq)$, discretize the grid finely, and associate the probability mass with each smaller deformed voxel to voxels in the camera grid $G_\mathcal{U}$.

Proposition 1: The PDF $p(u) \propto p(x)$ is well approximated by a set of weights $$\{w_i^u\}_i$$

on $G_\mathcal{U}$, if each voxel $(\breve{x}_i, X_i) \in$ is partitioned $N > 1$ smaller non-overlapping voxels of equal volume $$\left\{\left(\breve{x}_{in}, X_{in}\right)\right\}_{n=1}^N$$

with $\cup_n X_{in}=X_i$ and the transformed weights $$w_j^u = \sum_{\check{x}_{in}f^{-1}(\mathcal{U}_j)} \lambda^{-2} w_{in}^x \delta(X_{in}), \qquad (4)$$

where $\lambda$ is known from the camera transformation $f(\bullet)$.

The computation of PDFs in the camera frame according to Proposition 1 is appealing from a computational point of view, as the condition in the summation can be checked by $f(\check{x}_{in}) \in \mathcal{U}_j$ and vectorized. Furthermore, the computational complexity can be controlled by changing the parameter N. It is sufficient to let N=2, as motivated by ablation studies provided in the supplementary materials.

View Dependency

Note that p(u) does not account for occlusions created by the camera's perspective projection. Thus, sampling a ray considering only the object's geometry alone can cause occluded samples. To address this issue, the framework assumes that the density per voxel $\sigma_j$ and transmittance computed along a projection ray $$T_i = \exp\left(-\sum_{k=0}^{i} \sigma_k\right)$$

follows the standard volume rendering formulation. To enforce this assumption, the framework describes a proposition that changes the weights on the 3D image space to account for view dependency.

Proposition 2: The occlusion-aware PDF $\tilde{p}(u)$ is well approximated by the set of weights $$\{\tilde{w}_i^u\}_i$$

on $G_{\mathcal{U}}$, given Proposition 1, such that $$\tilde{w}_j^u = \sigma_j T_j = w_j^u \exp\left(-\sum_{i \in k(j)} w_j^u \delta(U_i)\right), \qquad (5)$$

where k(j) returns the indexes of the voxel collinear to $\check{u}_j$, i.e., all voxels with $(\check{u}, \check{v})=(\check{u}_y, \check{v}_j)$ and $\lambda=0$ until $\lambda_j$ (all cells intersecting the 3D orthogonal projection from the origin to the cell j).

The PDF that results from Preposition 2 is a probabilistic representation of the scene's surface seen from the camera, where the two first elements in the 3D space represent the image plane coordinates.

This weighting is biased along the ray, similar to NeuS. However, it remains aware of the occlusion. In contrast to this proposition, using NeuS volume rendering formulation is not feasible. First, the proposed interpolation scheme does not extend to SDF values, since the framework relies on probability definition to obtain the image grid weights. Second, if the framework were to interpolate the probabilities instead, getting the SDF values from the probabilities is not trivial, and the NeuS formulation requires the SDF values to compute the opacity. Ultimately, a biased sampler does not violate Preposition 2, meaning the sampled ray will intersect the surface.

Probabilistic Sampling

The next step in the framework is to sample the 3D points from $\tilde{p}(u)$. The framework conditions the sampling on the three dimensions. Therefore, the framework must compute marginal and conditional density functions for each axis to sample $\check{u} \in \mathcal{U}$ the point that defines the rendering ray.

Using the view-dependent PDF $\tilde{p}(u)$ in Preposition 2, the marginal and conditional probability functions for each random variable can be computed. Starting with u, the first marginal density function is defined as $$\tilde{p}(u) = \frac{1}{N_{U_{\check{u}}}} \sum_{j \in k(u)} \tilde{w}_j^u, \qquad (6)$$

where k(ŭ) outputs all the cells containing ŭ, and $N_{U_{\check{u}}}$ is the respective number of elements. Then, the first conditional is obtained considering $\tilde{p}(u)$ $$\tilde{p}(v, \lambda \,|\, u) = \frac{\tilde{p}(u)}{\tilde{p}(u)}. \qquad (7)$$

The second marginal, applied to v is expressed as $$\tilde{p}(v \,|\, u) = \frac{1}{N_{\check{u},\check{v}}} \sum_{j \in k(u,v)} \tilde{p}(v_j, \lambda_j \,|\, u), \qquad (8)$$

where k(ŭ, v̌) outputs all cells in with $(\check{u}, \check{v})=(\check{u}_j, \check{v}_j)$, and $N\mathcal{U}_{\check{u},\check{v}}$ is the number of selected cells. Finally, the second conditional is defined as $$\tilde{p}(\lambda \,|\, u, v) = \frac{\tilde{p}(v, \lambda \,|\, u)}{\tilde{p}(v \,|\, u)}. \qquad (9)$$

The framework can now guide the sampling of points $\check{u}=[\check{u}, \check{v}, \check{\lambda}] \in \mathcal{U}$ in the image projection space to obtain the 3D ray, knowing that each axis is conditional on the other. The framework starts by sampling ŭ from the first marginal using the inverse transform sampling [26]. Then, the framework approximates the second marginal p(v|ŭ) from the samples ŭ using bilinear interpolation. Following the same inverse sampling strategy, v̌ is sampled according to p(v|ŭ). Finally, using trilinear interpolation, the framework approximates the second conditional p(λ|ŭ,ŭ), with ŭ and v̌, and sample $\check{\lambda}$. The process is repeated for the number of rays.

Ray Sampling

From the sampled point image coordinate pair (ŭ, v̌), the framework computes the ray for the neural rendering pipeline of the camera pose. Additionally, given that the proposed pipeline focuses the rays where exists surfaces, the background, and other scene regions require training samples. Thus, the framework sets 20% of the rays to be sampled uniformly in the image, at the start of training. During training, the percentage is increased to 40%, 60%, and 80% at the same training progress. This allows for higher confidence in the 3D scene estimation overall, especially at the earlier stages of training. The whole image is refined later with the increase of uniform sampling. The models trained with the proposed sampling scheme show lower variance in the SDF network compared to the ones that use only image sampling.

As the framework proceeds through the neural surface rendering pipeline, and when they are available, the framework incorporates the surface estimates in Gaussian samples $$\mathcal{N}(\tilde{\lambda}, \frac{\pi^2}{3s^2})$$

to the coarser proposal in the hierarchical ray sampling. The variance is determined by the normal approximation of the logistic distribution, with the mean being the sampled $\tilde{\lambda}$.

Example Discussion

Figure 8:
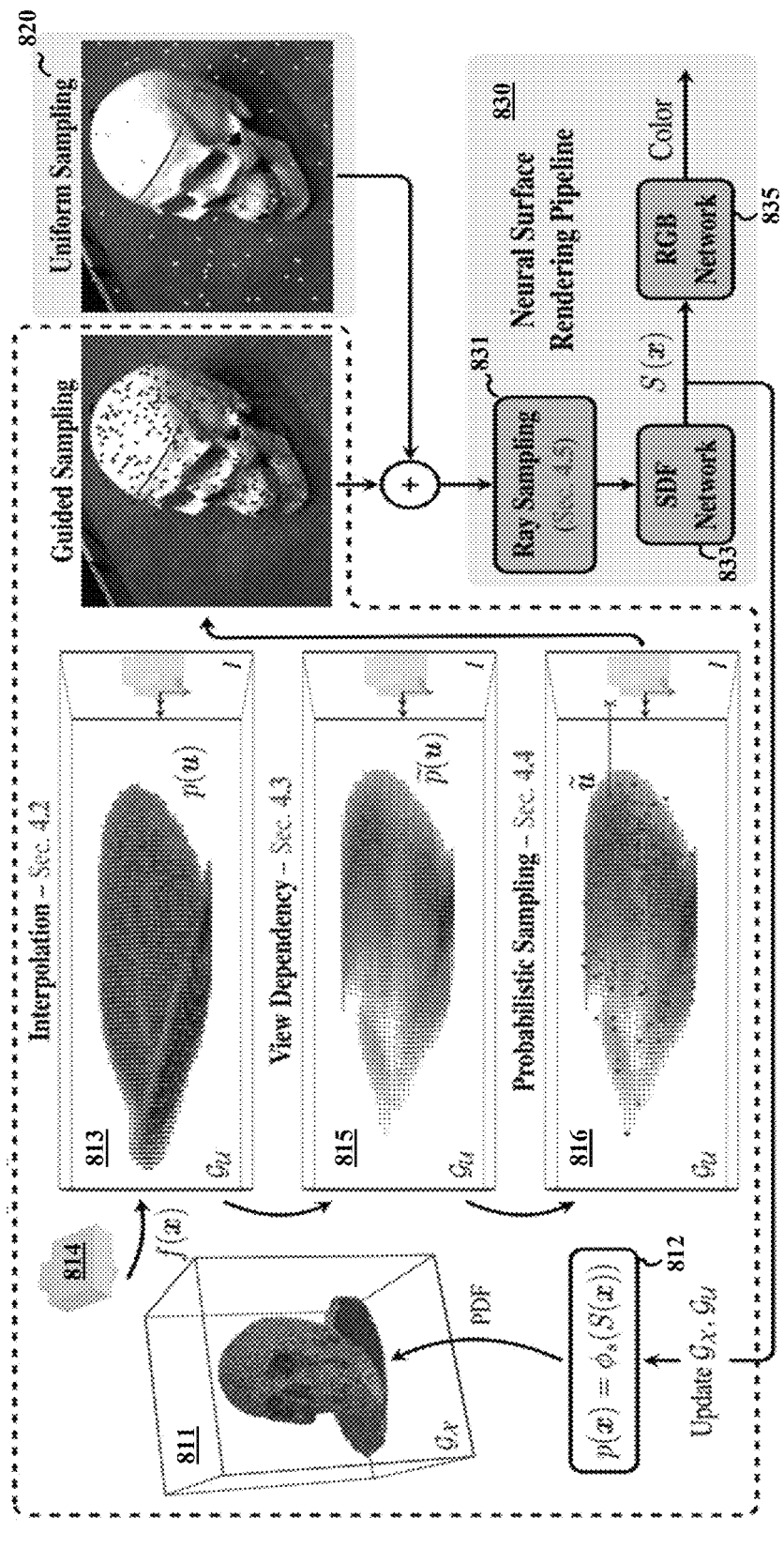
FIG. 8 illustrates an application of a framework in an implementation.

FIG. 8 illustrates an application of the framework discussed above. FIG. 8 considers a neural surface rendering pipeline (pipeline 830). Framework 800 extends the sampling of rays to consider a scene's geometry by using a surface model estimate. The scene 811 is represented as a 3D grid $G_x$, and characterized by a PDF 812 [p(x)] computed from an SDF network 833 in pipeline 830 and modeled by a logistic distribution 812 of the SDF values $\phi_s(S(x))$. Usually, rays are sampled uniformly in the image space. However, with knowledge of the scene, framework 800 uses a 3D image space (that includes depth), represented as $G_u$, where one can define p(u)—based on p(x). This PDF is interpolated by transforming the points from $G_x$ according to f(x) to the current camera space and finely discretizing to interpolate the new PDF 813 in $G_u$. The framework considers the camera viewpoint 814 of the scene, by weighting p(u). In the 3D image space, a line perpendicular to the image plane is the ray by definition. Thus, by considering p(u) as the volume density, the framework weighs the new PDF 815 [$\tilde{p}(u)$]. In the shown grids, color hue maps to the probability value, normalized for each grid. A higher hue is more probable. Points with very low probabilities are filtered. At every training step, and considering the 3D dimensions, a number of points are sampled from $\tilde{p}(u)$ to create ray samples 816 [$\tilde{u}$]. Note that this ray will contain depth information for the importance sampling in the ray tracing. Additionally, the framework samples rays uniformly (uniform sampling 820) to avoid overfitting the network to the more intricated scene parts, since the proposed solution focuses solely on surface areas. The sampled rays (guided and uniform) are trained as the usual neural surface rendering pipeline 830, which includes ray sampling 831, an SDF network 833, and an RGB network 835. The proposed framework need not change the backbone models and can be inserted in similar pipelines.

FIG. 9 illustrates computing device 901 that is representative of any system or collection of systems in which the various processes, programs, services, and scenarios disclosed herein may be implemented. Examples of computing device 901 include, but are not limited to, desktop and laptop computers, tablet computers, mobile computers, server computers, web servers, cloud computing platforms, and data center equipment, as well as any other type of physical or virtual server machine, container, and any variation or combination thereof.

Computing device 901 may be implemented as a single apparatus, system, or device or may be implemented in a distributed manner as multiple apparatuses, systems, or devices. Computing device 901 includes, but is not limited to, processing system 902, storage system 903, software 905, communication interface system 907, and user interface system 909. Processing system 902 is operatively coupled with storage system 903, communication interface system 907, and user interface system 909.

Processing system 902 loads and executes software 905 from storage system 903. Software 905 includes and implements vision process 906, which is representative of sampling process 200, sampling process 400, training process 500, and rendering process 600. When executed by processing system 902, software 905 directs processing system 902 to operate as described herein for at least the various processes, operational scenarios, and sequences discussed in the foregoing implementations. Computing device 901 may optionally include additional devices, features, or functionality not discussed for purposes of brevity.

Referring still to FIG. 9, processing system 902 may comprise a micro-processor and other circuitry that retrieves and executes software 905 from storage system 903. Processing system 902 may be implemented within a single processing device but may also be distributed across multiple processing devices or sub-systems that cooperate in executing program instructions. Examples of processing system 902 include general purpose central processing units, graphical processing units, digital signal processors, application specific processors, and logic devices, as well as any other type of processing device, combinations, or variations thereof.

Storage system 903 may comprise any computer readable storage media readable by processing system 902 and capable of storing software 905. Storage system 903 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 903 may also include computer readable communication media over which at least some of software 905 may be communicated internally or externally. Storage system 903 may be implemented as a single storage device but may also be implemented across multiple storage devices or sub-systems co-located or distributed relative to each other. Storage system 903 may comprise additional elements, such as a controller, capable of communicating with processing system 902 or possibly other systems.

Software 905 (vision process 906) may be implemented in program instructions and among other functions may, when executed by processing system 902, direct processing system 902 to operate as described with respect to the various operational scenarios, sequences, frameworks, and processes illustrated and/or discussed herein. For example, software 905 may include program instructions for implementing the sampling, training, and/or rendering processes described herein, as well as the probabilistic guided sampling discussed herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 905 may include additional processes, programs, or components, such as operating system software, virtualization software, or other application software. Software 905 may also comprise firmware or some other form of machine-readable processing instructions executable by processing system 902.

In general, software 905 may, when loaded into processing system 902 and executed, transform a suitable apparatus, system, or device (of which computing device 901 is representative) overall from a general-purpose computing system into a special-purpose computing system customized to perform computer vision processes in an optimized manner. Indeed, encoding software 905 on storage system 903 may transform the physical structure of storage system 903. The specific transformation of the physical structure may depend on various factors in different implementations of this description. Examples of such factors may include, but are not limited to, the technology used to implement the storage media of storage system 903 and whether the computer-storage media are characterized as primary or secondary storage, as well as other factors.

For example, if the computer readable storage media are implemented as semiconductor-based memory, software 905 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 907 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing device 901 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Indeed, the included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A method for training a neural radiance field (NeRF) using multiple images of a scene captured from different viewing directions, the method comprising:

determining foreground pixels in each of the multiple images;

selecting a non-uniform sample of pixels from each of the multiple images such that the foreground pixels are overrepresented in the non-uniform sample of pixels relative to background pixels; and training the NeRF using color and radiance values of voxels on rays associated with the non-uniform sample of pixels, wherein determining the foreground pixels in each of the multiple images comprises, for each pixel in at least an image of the multiple images:

determining a probability that the pixel comprises a foreground pixel; and classifying the pixel as belonging to the foreground pixels or the background pixels based on the probability determined for the pixel, and wherein determining the probability that the pixel comprises a foreground pixel comprising:

supplying image-space coordinates of the pixel as input to an image-space probability density function (PDF) that outputs the probability;

computing a grid-space probability density function (PDF) for the scene using a neural representation of a signed distance function (SDF) for the scene; and converting the grid-space PDF into the image-space PDF.

2. The method of claim 1 wherein training the NeRF comprises, for each pixel in the non-uniform sample of pixels:

obtaining, from the NeRF, predicted color and radiance values for the voxels on a ray corresponding to the pixel;

determining predicted color and radiance values for the pixel based on the predicted color and radiance values for the voxels on the ray;

computing a loss function based on the predicted color and radiance values for the pixel and known color and radiance values for the pixel; and updating parameters of the NeRF based on a result of the loss function.

3. The method of claim 2 further comprising generating a new image of the scene from an arbitrary viewing direction by at least, for each new pixel in the new image of the scene, querying the NeRF for predicted radiance values at points along a new ray propagating from the new pixel; and determining color values for the new pixel based on the predicted radiance values.

4. The method of claim 1 wherein determining the foreground pixels in each of the multiple images comprises performing image segmentation on each of the multiple images to segment each image into the foreground pixels and the background pixels.

5. The method of claim 1 further comprising training a neural implicit representation of a signed distance function (SDF) to output signed distances of voxels to a foreground object of interest in the scene, and wherein determining the foreground pixels comprises determining the foreground pixels using the neural implicit representation of the SDF.

6. The method of claim 1 further comprising:

identifying a uniform sample of pixels from each of the multiple images; and further training the NeRF using radiance values of voxels on rays propagating from each of the uniform sample of pixels along a corresponding viewing direction into the scene.

7. The method of claim 1 further comprising, for each of the rays propagating from each of the non-uniform sample of pixels, selecting the voxels on a non-uniform basis that filters out voxels not visible from the corresponding viewing direction.

8. A computing apparatus comprising:

one or more computer readable storage media; and program instructions, stored on the one or more computer readable storage media, for training a neural radiance field (NeRF) using multiple images of a scene captured from different viewing directions;

wherein the program instructions, when executed by one or more processors, direct the computing apparatus to at least:

determine foreground pixels in each of the multiple images;

identify a non-uniform sample of pixels from each of the multiple images such that the foreground pixels are overrepresented in the non-uniform sample of pixels relative to background pixels; and train the NeRF using color and radiance values of voxels on rays propagating from each of the non-uniform sample of pixels into the scene, wherein to determine the foreground pixels in each of the multiple images, the program instructions direct the computing apparatus to, for each pixel in at least an image of the multiple images:

determine a probability that the pixel comprises a foreground pixel; and classifying the pixel as belonging to the foreground pixels or the background pixels based on the probability determined for the pixel, wherein, to determine the probability that the pixel comprises a foreground pixel, the program instructions direct the computing apparatus to supply image-space coordinates of the pixel as input to an image-space probability density function (PDF) that outputs the probability, and wherein the program instructions further direct the computing apparatus to:

compute a grid-space probability density function (PDF) for the scene using a neural representation of a signed distance function (SDF) for the scene; and transform the grid-space PDF into the image-space PDF.

9. The computing apparatus of claim 8 wherein, to train the NeRF, the program instructions direct the computing apparatus to, for each pixel in the non-uniform sample of pixels:

obtain, from the NeRF, predicted color and radiance values for the voxels on a ray corresponding to the pixel;

determine predicted color and radiance values for the pixel based on the predicted color and radiance values for the voxels on the ray;

compute a loss function based on the predicted color and radiance values for the pixel and known color and radiance values for the pixel; and update parameters of the NeRF based on a result of the loss function.

10. The computing apparatus of claim 9 wherein the program instructions further direct the computing apparatus to generate a new image of the scene from an arbitrary viewing direction using the NeRF, including by:

querying the NeRF for predicted radiance values at points along a new ray propagating from the new pixel into the scene; and determining color values for the new pixel based on the predicted radiance values.

11. The computing apparatus of claim 8 wherein, to determine the foreground pixels in each of the multiple images, the program instructions direct the computing apparatus to perform image segmentation on each of the multiple images to segment each image into the foreground pixels and the background pixels.

12. The computing apparatus of claim 8 wherein the program instructions further direct the computing apparatus to train a neural implicit representation of a signed distance function (SDF) to output signed distances of voxels to a foreground object of interest in the scene, and wherein, to determine the foreground pixels, the program instructions direct the computing apparatus to determine the foreground pixels using the neural implicit representation of the SDF.

13. The computing apparatus of claim 8 wherein the program instructions further direct the computing apparatus to:

identify a uniform sample of pixels from each of the multiple images; and further train the NeRF using radiance values of voxels on rays propagating from each of the uniform sample of pixels along a corresponding viewing direction into the scene.

14. The computing apparatus of claim 8 wherein the program instructions further direct the computing apparatus to, for each of the rays propagating from each of the non-uniform sample of pixels, select the voxels on a non-uniform basis that filters out voxels not visible from the corresponding viewing direction.

* * * * *